(12) United States Patent
Zhang et al.

(10) Patent No.: US 8,264,988 B2
(45) Date of Patent: Sep. 11, 2012

(54) METHOD FOR INFERRING PHYSICAL NETWORK TOPOLOGY FROM END-TO-END MEASUREMENT

(75) Inventors: Yueping Zhang, Carteret, NJ (US); Yu Ru, Urbana, IL (US); Guofei Jiang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 137 days.

(21) Appl. No.: 12/697,237

(22) Filed: Jan. 30, 2010

(65) Prior Publication Data

US 2011/0058499 A1 Mar. 10, 2011

Related U.S. Application Data

(60) Provisional application No. 61/148,430, filed on Jan. 30, 2009.

(51) Int. Cl.
*H04L 12/28* (2006.01)
*G06F 15/16* (2006.01)

(52) U.S. Cl. .......................... 370/256; 370/408; 709/252

(58) Field of Classification Search ........................ None
See application file for complete search history.

(56) References Cited

U.S. PATENT DOCUMENTS

| | | | | |
|---|---|---|---|---|
| 5,253,248 A | * | 10/1993 | Dravida et al. | 370/256 |
| 5,606,669 A | * | 2/1997 | Bertin et al. | 370/256 |
| 5,805,578 A | * | 9/1998 | Stirpe et al. | 370/255 |
| 6,246,689 B1 | * | 6/2001 | Shavitt | 370/256 |
| 7,701,881 B1 | * | 4/2010 | Sankaran | 370/256 |
| 7,843,855 B2 | * | 11/2010 | O'Neal | 370/256 |
| 7,934,230 B2 | * | 4/2011 | Badt et al. | 709/246 |
| 7,940,685 B1 | * | 5/2011 | Breslau et al. | 370/251 |
| 2004/0252690 A1 | * | 12/2004 | Pung et al. | 370/390 |
| 2004/0260755 A1 | * | 12/2004 | Bardzil et al. | 709/200 |
| 2005/0083933 A1 | * | 4/2005 | Fine et al. | 370/390 |
| 2005/0105475 A1 | * | 5/2005 | Norrgard et al. | 370/254 |
| 2005/0111386 A1 | * | 5/2005 | Jain et al. | 370/256 |
| 2005/0243740 A1 | * | 11/2005 | Chen et al. | 370/256 |
| 2008/0056163 A1 | * | 3/2008 | Chan et al. | 370/255 |
| 2008/0080507 A1 | * | 4/2008 | Swallow et al. | 370/392 |
| 2010/0271981 A1 | * | 10/2010 | Zhao et al. | 370/256 |

OTHER PUBLICATIONS

Coates et al., Merging logical topologies using end-to-end measurements, IMC '03 Proceedings of the 3rd ACM SIGCOMM conference on Internet measurement, pp. 192-203, 2003.*

Tian et al., Routing Topology Identification Based on Multiple Sources End-to-end Measurements, 2010 Asia-Pacific Conference on Wearable Computing Systems (APWCS), pp. 322-325, Apr. 17-18, 2010.*

* cited by examiner

*Primary Examiner* — Timothy J Weidner

(74) *Attorney, Agent, or Firm* — Jeffery Brosemer; Joseph Kolodka

(57) ABSTRACT

A method for inferring end-to-end network topology and to accurately determine a layer-3 routing tree between one sender and a set of receivers in the presence of anonymous routers in a network.

1 Claim, 21 Drawing Sheets

Algorithm: BPI

Input: Source $S$ and destinations $R_1$ and $R_2$
Output: Branching node Obtain $N_{S,R_1}$, $N_{S,R_2}$, and $m_{S,R_1,R_2} = \min(N_{S,R_1}, N_{S,R_2})$;

for $i = 1$ to $K$ do
  for $j = 1$ to $m_{S,R_1,R_2}$ do
    Set TTL of $P_3$ to $j$, send $P_1$, $P_2$, and $P_3$ from $S$ to $R_1$;
    Measure and calculate $\delta_i(j)$;
  end
  Set TTL of $P_3$ to 255, send $P_1$ and $P_3$ to $R_1$ and $P_2$ to $R_2$;
  Measure and calculate $\delta'(j)$;
end

Calculate mean $E[q_j]$ and $E[q'_j]$;
return $\arg_j \min |E[q_j] - E[q'_j]|$;

*FIG. 6*

Algorithm: MT

Input: Server $S$ and a set of $N$ clients $C = \{R_1, \ldots, R_N\}$
Output: Routing tree $T$ from $S$ to $C$ $\mathcal{D} = \mathcal{E} = \phi; i = 0;$
while $C \neq \phi$
  $R_1$ = a random client in $C$; $C = C \setminus R_1$; $flag = 0;$
  if $\mathcal{E} == \phi$
    $R_2$ = a client with the longest path in $\mathcal{E}$;
    $T_i = \phi; i = i+1; flag = 1;$
  else
    $R_2$ = a random client in $C$; $C = C \setminus R_2$
  if CP($S, R_1, R_2$)
    $\mathcal{E} = \mathcal{E} \cup \{R_1, R_2\};$
    Update tree $T_i$;
  else
    if $flag$
      $\mathcal{D} = \mathcal{D} \cup \{R_1, R_2\};$
    else
      $\mathcal{D} = \mathcal{D} \cup \{R_1\};$
  if $C == \phi$
    $C = \mathcal{D};$ $T$ = merge the obtained $M$ trees $T_1, \ldots, T_M$ at the root
return $T$;

*FIG. 7*

Algorithm: CP

Input: Source $S$ and destinations $R_1$ and $R_2$
Output: Branching node for $i = 1$ to $\alpha$
  $j = \text{BPI}(S, R_1, R_2);$
  $j^c = \text{BPI}(S, R_2, R_1);$
  if $j == j^c$
    return $j + 1;$
  end
end
return 0;

*FIG. 10*

METHOD FOR INFERRING PHYSICAL NETWORK TOPOLOGY FROM END-TO-END MEASUREMENT

CROSS REFERENCE TO RELATED APPLICATION

This application claims the benefit of U.S. Provisional Patent Application No. 61/148,430 filed Jan. 30, 2009 which is incorporated by reference as if set forth at length herein.

FIELD OF DISCLOSURE

This disclosure relates to the field of telecommunications and in particular to method for inferring a physical network topology from end-to-end measurement.

BACKGROUND OF DISCLOSURE

As the Internet rapidly scales in size, capacity, and capability, a growing number of computing and communication services are migrating to a common Internet Protocol (IP). This in turn results in an increased demand for highly reliable and effective IP service management schemes, where accurate network topology information is of critical importance.

Driven by this need, network topology inference is an activity which has received a significant amount of interests from both the research community and industry during the last decade. Consequently, a number of schemes have been developed for estimating network routing trees for both multicast and unicast traffic in a given IP network. Their underlying topology-discovering mechanisms have generally evolved from traceroute-based techniques to those employing more sophisticated metrics including hamming distance, fan-out, inter-packet delay variance, and additive metrics (e.g., loss, delay, and utilization).

Unfortunately however, topologies determined using existing methods generally treat each single link as a logical link which may actually correspond to multiple physical layer-3 devices and their interconnecting links in the actual network. Consequently, the resulting topologies so determined are generally unsuitable for applications (such as fine-grained anomaly localization) where detailed topology information is required.

SUMMARY OF DISCLOSURE

An advance is made in the art according to an aspect of the present invention directed to a deterministic, computer implemented layer-3 (L3) topology inference method we call NetScan. In an exemplary embodiment, NetScan includes an end-to-end routing tree discovery method that leverages a time-to-live (TTL) decrement in the IP header and the relationship between queuing delay and delay variations between probing packets.

Operationally, during a measurement interval, a sender sends a sequence of probing packets to two other receivers. Based on measurements conducted at the receivers, NetScan precisely determines the two L3 routing paths and the node (hop) where they diverge.

Advantageously, this probing technique does not require any clock synchronization between hosts and can correctly identify anonymous routers in the inferred topology, which is in sharp distinction to and a marked improvement over traceroute-based schemes.

Of further advantage, topologies obtained using NetScan exhibit the desirable characteristic that each node represents a physical L3 device. By changing the source-destination pairs and repeating the NetScan probing process, we obtain multiple single-source routing trees. Finally, a merging method is used to combine all sub-trees into a single routing tree.

BRIEF DESCRIPTION OF THE DRAWING

A more complete understanding of the disclosure may be realized by reference to the accompanying drawing in which:

FIG. 6 is a pseudocode listing of a branching-probe identification method according to the present disclosure;

FIG. 7 is a pseudocode listing of a tree merging method according to the present disclosure;

FIG. 10 is a pseudocode listing of a complementary probing method according to the present disclosure;

DESCRIPTION OF EMBODIMENTS

Figure 1:
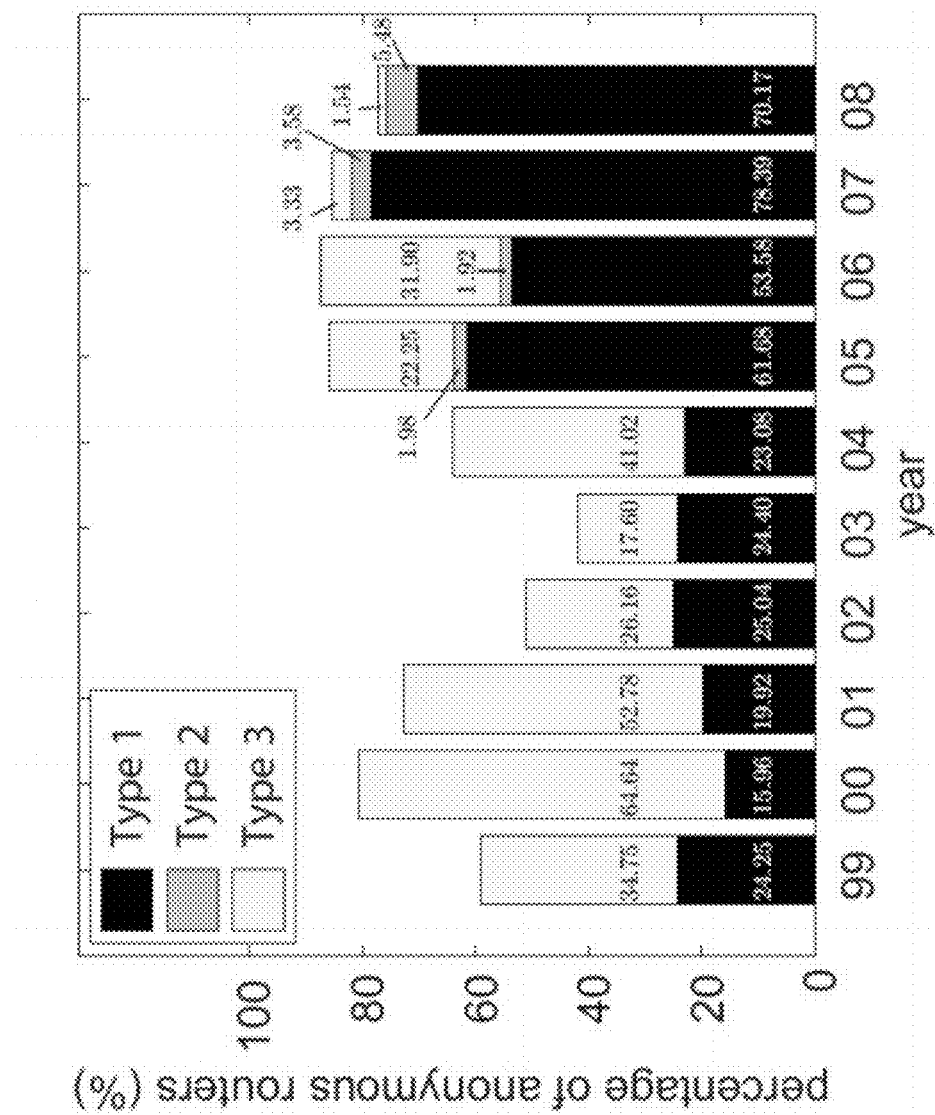
FIG. 1 is a bar graph showing a percentage of anonymous routers in the Internet by type.

The following merely illustrates the principles of the various embodiments. It will thus be appreciated that those skilled in the art will be able to devise various arrangements which, although not explicitly described or shown herein, embody the principles of the embodiments and are included within their spirit and scope.

Furthermore, all examples and conditional language recited herein are principally intended expressly to be only for pedagogical purposes to aid the reader in understanding the principles of the embodiments and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGs. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent as those shown herein.

Unless otherwise explicitly specified herein, the drawings are not drawn to scale.

By way of some additional background, it is noted that a number of existing network diagnosis and discovery mechanisms often utilize active probing messages (e.g., ping) and router responses (e.g., ICMP messages). One such well-known example is traceroute in which a sender increments a time-to-live (TTL) value of each packet and obtains the IP addresses of any intermediate routers from the ICMP_time_exceeded packet sent by each router. However, a large number of routers in the Internet are configured not to reveal their identity and do not respond to traceroute probing. Such routers are generally termed anonymous routers.

As may be appreciated, there are a number of reasons for a router to remain anonymous. First—for security concerns—a router may either suppress ICMP responses to unsolicited probing packets or use the destination address of traceroute packets instead of its own address as source address for outgoing ICMP packets. Second, a router may suppress ICMP responses if the incoming probing rate exceeds a certain threshold or the router is experiencing a congestion condition.

Third, a router may become anonymous if it uses a private IP address. For our purposes, we refer to the above three classes of routers as Type 1, 2, and 3, respectively. FIG. 1 illustrates the general percentage(s) of these three types of anonymous routers among all routers as determined by recent studies over a multiyear period. It is evident that existence of anonymous routers is in fact very common in today's network.

As noted previously, among all existing Internet topology inference mechanisms, traceroute-based techniques are among the earliest and most widely used. As can also be readily appreciated, traceroute-based techniques require the cooperation of a number of individual network elements, and in particular the ability to send out ICMP_time_exceeded packets. Consequently traceroute-based methods may produce incomplete or inaccurate topologies of networks containing anonymous routers.

To overcome the infirmities of traceroute-based schemes, a number of topology-inference techniques have been developed. One of particular interest, a unicast sandwich probing scheme has been employed to infer the routing tree topology for one sender and multiple receivers.

Figure 2:
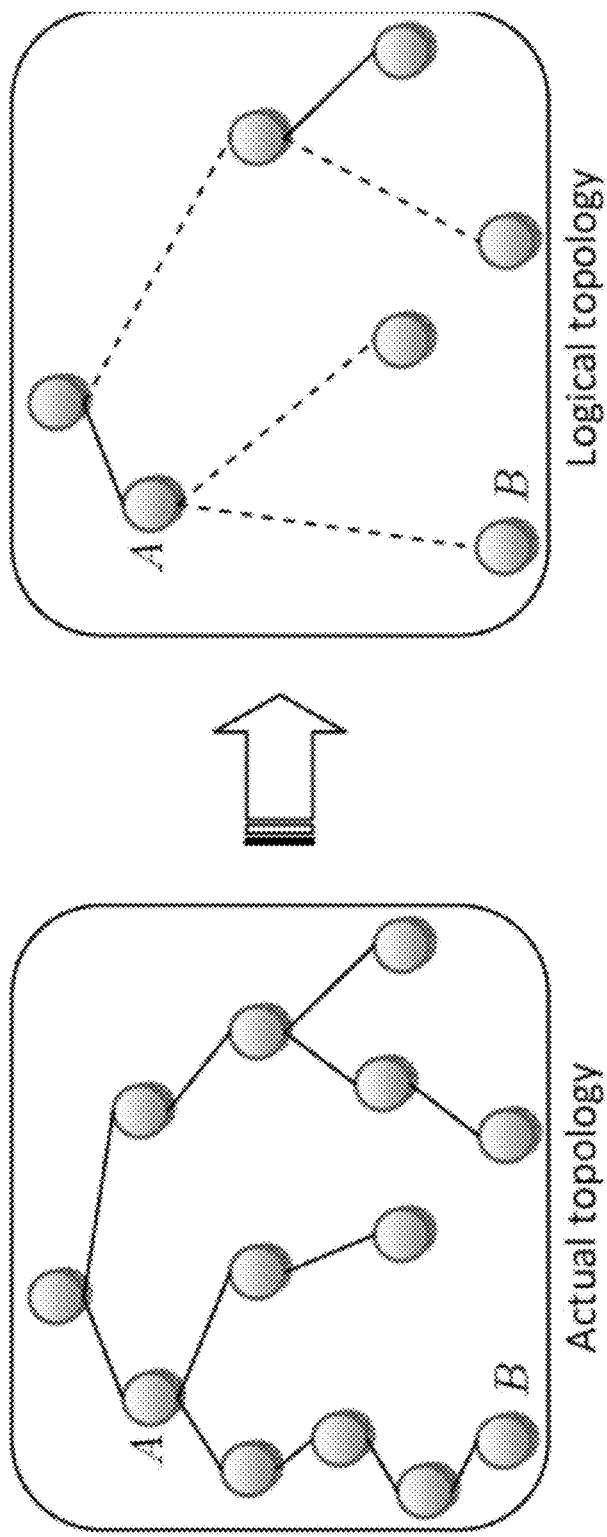
FIG. 2 illustrates a logical routing topology.

One consequence of the sandwich probing scheme is that topology trees obtained are logical in which only the branching node of two paths is identified and all links and nodes between two branching nodes are merged into one link. As an example, FIG. 2 shows a simple network topology in which three nodes and four links between nodes A and B in the actual topology are represented by a single link the logical topology.

Figure 3:
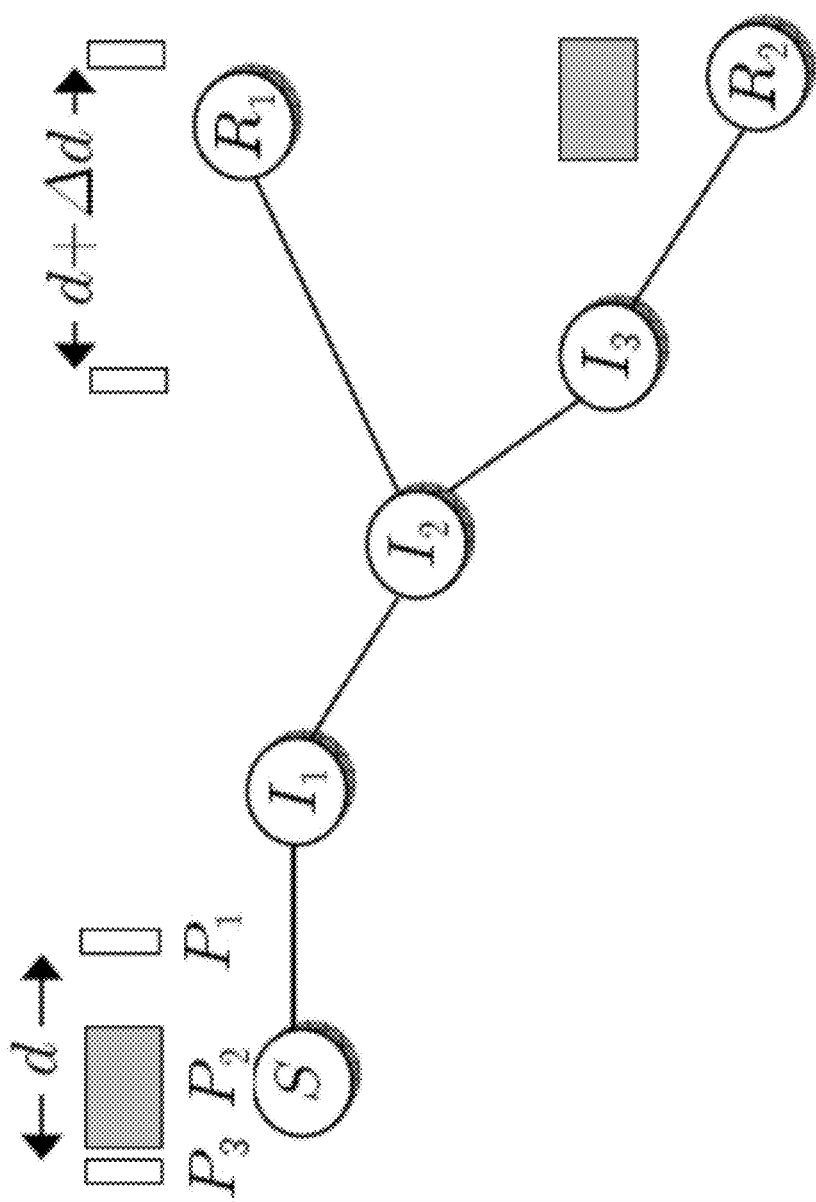
FIG. 3 illustrates of the sandwich probing scheme.

Consider FIG. 3 for an illustration of sandwich probing. As seen in the figure, a sandwich probe comprises two small packets ($P_1$ and $P_3$) having packet size $s_1$ separated by a large packet ($P_2$) having packet size $s_2$. The two small packets are sent out by a source at a fixed time interval d. In an exemplary scenario such as that shown in FIG. 3, the source S first transmits $P_1$ to a first receiver $R_1$. After d time units have elapsed, it sends out back-to-back packets $P_2$ and $P_3$, which are destined for $R_2$ and $R_1$, respectively.

Assume that the shared path between paths S-$R_1$ and S-$R_2$ comprises m links having bandwidths of $C_1, C_2, \ldots, C_m$. In the absence of cross traffic $P_3$ is always queued immediately after P in every queue on the shared path if:

$$\frac{s_2}{s_1} \geq \frac{C_{i+1}}{C_i}, \quad i = 1, \ldots, m. \tag{1}$$

If we set $s_1=50$ and $s_2=1500$ bytes, condition (1) always holds unless $C_{i+1}$ is more than 30 times larger than $C_i$.

Furthermore, due—in part—to queueing delay experienced by the three packets, the initial time interval d between $P_1$ and $P_3$ is changed by $\delta$ (i.e., the interval becomes d+$\delta$) at the branching router where paths S-$R_1$ and S-$R_2$ diverge. As such, the following condition guarantees $\delta$ is preserved after the branching point:

$$\frac{s_1}{d+\delta} \leq \min_{m+1 \leq i \leq n} C_i, \tag{2}$$

where n is the total number of links in the path between S and $R_1$.

As may be appreciated, for a small $s_1$ (50 bytes) and large d (50 ms), this last condition can be easily satisfied in practice. Therefore, it is easy to see that g is a function of queuing delay up to the branching point. Leveraging this observation and employing a maximum penalized likelihood criterion, Coates et al. developed a probabilistic method called nettomo for reconstructing the routing tree between one source and a set of destinations.

Notwithstanding this however, the resulting topology discovery scheme nettomo also exhibits at least two key limitations. First—similar to other methods—topology trees reconstructed by nettomo are logical, which is undesirable in many applications as noted previously. Second, this method uses a maximum likelihood criterion to overcome measurements noise introduced by cross traffic. Thus, to achieve an adequate accuracy this method requires a large number of measurements. For example, 7000 rounds of probing may need to be performed to achieve an accuracy of 80% for a one-sender-nine-receiver topology with light cross traffic. If we set d=100 ms, this translates to around 12 hours, which may not be desirable in practice.

As previously mentioned, at the branching point the initial interval d between two small packets $P_1$ and $P_3$ is disturbed by a small number δ due to queuing delays experienced by the three packets. We next seek to better understand the value δ and its relationship with queuing delay.

Once again consider the one-sender-two-receiver topology as shown in FIG. 3. Assume there are m intermediate routers in the common path between S-$R_1$ and S-$R_2$ and n routers (of capacities $C_1, C_2, \ldots, C_n$) in the path of S-$R_1$. Let T be the total propagation delay between S and $R_1$.

We first assume there is no cross traffic in the system and condition (1) is satisfied. Suppose at time $t_0$, $P_1$ is sent out. Then, at $$t_1 = t_0 + T + \sum_{i=1}^{n} s_1/C_i,$$

it arrives at the destination $R_1$. Here, $s_1/C_i$ is the sojourn time required by router i to transmit a packet of size $s_1$.

Next, after d time units, $P_2$ and $P_3$ are sent out pack-to-pack. Then, at $$t_3 = t_0 + d + T + \sum_{i=1}^{n} s_1/C_i + \sum_{i=1}^{m} s_2/C_i,$$

$P_3$ is received by $R_1$. Thus, we can calculate δ as:

$$\delta = t_3 - t_1 - d = \sum_{i=1}^{m} \frac{s_2}{C_i}. \qquad (3)$$

Recalling that we assume (1) is satisfied, implying that $P_3$ is always queued right after $P_2$. Therefore, δ immediately translates into queuing delay experienced by $P_3$. This result is easily verified using simulations.

Next consider the case where cross traffic is present in the system. For ease of presentation, we first assume that $P_3$ is always queued immediately after P and discuss more generic cases shortly. Denoting by $q_i(t)$ queuing delay of router i at time t and following the above notation and procedure, we derive an equation of δ as below:

$$\delta = \sum_{i=1}^{n} (q_i(\tau_i^{(3)}) - q_i(\tau_i^{(1)})). \qquad (4)$$

Since $P_2$ and $P_3$ are queued back-to-back, we have $q_i(\tau_i^{(3)}) = q_i(\tau_i^{(2)}) + s_2/C_i$ for i=1, . . . , m. The last equation can be rewritten as:

$$\delta = \sum_{i=1}^{m} \left( \frac{s_2}{C_i} + q_i(\tau_i^{(2)}) - q_i(\tau_i^{(1)}) \right) + \sum_{i=m+1}^{n} (q_i(\tau_i^{(3)}) - q_i(\tau_i^{(1)})), \qquad (5)$$

where $\tau_i^{(k)}$ is the time when packet k arrives at router i. Now, we have the equation of δ for a single round of probing. Next, we repeat the probing process for K times and take the mean of the resulting δ. Then, we arrive at the following equation:

$$E[\delta] = \sum_{i=1}^{m} \frac{s_2}{C_i} + \sum_{i=1}^{m} (E[q_i(\tau_i^{(2)})] - E[q_i(\tau_i^{(1)})]) \qquad (6)$$

$$\sum_{i=m+1}^{n} (E[q_i(\tau_i^{(3)})] - E[q_i(\tau_i^{(1)})]).$$

If d is chosen large enough, packets $P_2$ and $P_3$ will not be buffered in the same queue as $P_1$ and therefore $\{q_i(\tau_i^{(1)})\}$ and $\{q_i(\tau_i^{(3)})\}$ or $\{q_i(\tau_i^{(2)})\}$ and $\{q_i(\tau_i^{(3)})\}$ can be considered independent and identically distributed. Then, we have $E[q_i(\tau_i^{(2)})] - E[q_i(\tau_i^{(1)})] \approx 0$ and $E[q_i(\tau_i^{(2)})] - E[q_i(\tau_i^{(1)})] \approx 0$, which translate $E[\delta]$ in (6) to the following approximation:

$$E[\delta] \approx \sum_{i=1}^{m} \frac{s_2}{C_i}, \qquad (7)$$

which is simply the transmission delay introduced by the large packet $P_2$ and is the same as δ in (3) in the absence of cross traffic.

Figure 4:
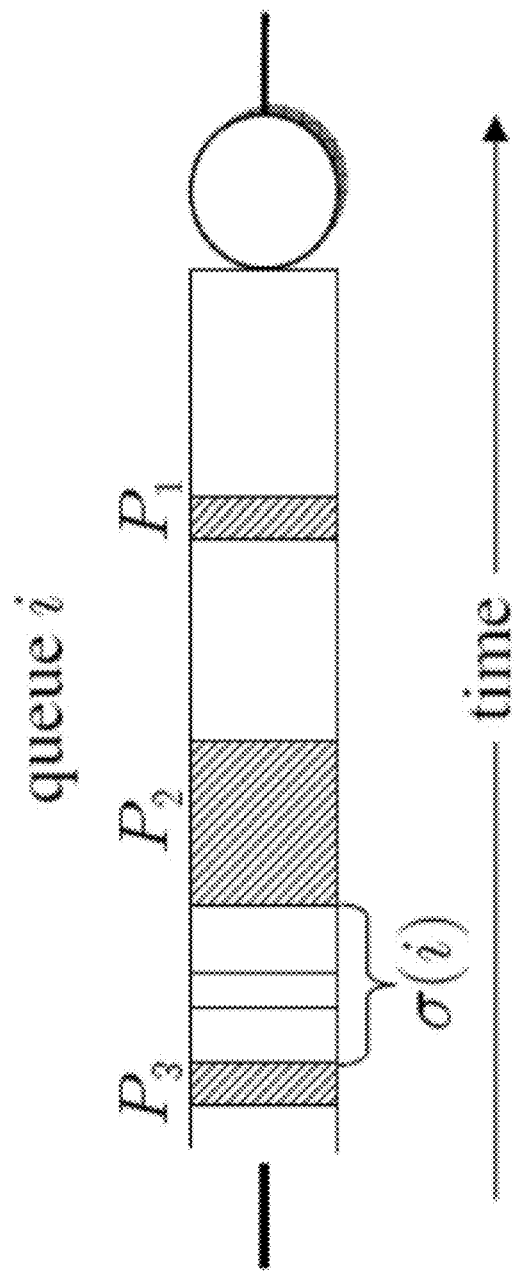
FIG. 4 illustrates a sandwich probe in a queue under cross traffic.
Figure 5:
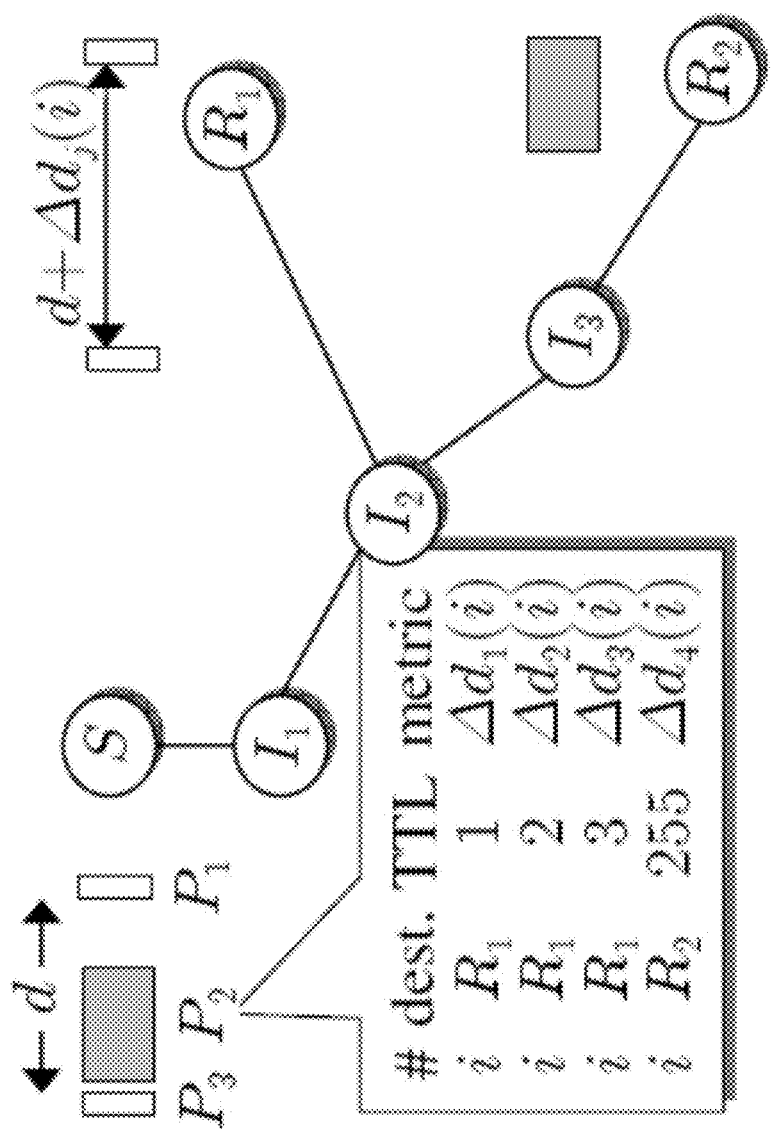
FIG. 5 illustrates the NetScan probing scheme.

Next, we relax the previous assumption that $P_3$ is always queued immediately after $P_2$. In practice, equation (7) may not precisely hold under cross traffic, in which case packets of the background traffic may exist between $P_2$ and $P_3$ in the queue, as illustrated in FIG. 4. Suppose the background traffic is light such that $P_2$ and $P_3$ are still very close to each other and denote by σ(i) the queuing delay difference introduced by the packets between $P_2$ and $P_3$ in queue i. Then we can have the following approximation between $q_i(\tau_i^{(2)})$ and $q_i(\tau_i^{(3)})$:

$$q_i(\tau_i^{(3)}) \approx q_i(\tau_i^{(2)}) + s_2 + C_i + \sigma(i). \qquad (8)$$

Following the procedure for deriving (7), we arrive at:

$$E[\delta] \approx \sum_{i=1}^{m} \left( \frac{s_2}{C_i} + E[\sigma(i)] \right). \qquad (9)$$

Since $s_2/C_i$ is positive and $E[\sigma(i)]$ is a non-negative function of i, it immediately follows that $E[\delta]$ in (9) is a monotonically increasing function of i. However, we should note that under heavy cross traffic, packets P and $P_3$ become far apart in the queue and consequently approximation (8) and (9) become less accurate.

Accordingly, it should be understood by those skilled in the art that the expectation of δ can be approximated by (9), whose value strictly increases as P travels along the path up to the branching point.

To infer the routing topology tree in a one-sender-two-receiver scenario such as that shown in FIG. 3, we leverage the result in (9) and time-to-live (TTL) decrement in the IP packet header to identify the branching node.

We define $N_{SR_i}$ as the number of hops between hosts S and $R_1$ and $m_{S,R_1,R_2} = \min(N_{S,R_1}, N_{S,R_2})$, which can be used as an upper bound on the length of the shared path between S-$R_1$ and S-$R_2$. Here, $N_{S,R_1}$ and $N_{S,R_2}$ can be determined by sending a packet with the default TTL value 255 from S to $R_1$ and $R_2$, respectively, and then checking the TTL decrements of the packets at the receiving end.

Then, our probing algorithm will initiate $m_{S,R_1,R_2}+1$ sandwich probes with different TTL values for the large packet $P_2$. Specifically, the large packet $P_2$ of the j-th sandwich probe has TTL equal to j (where $1 \leq j \leq m_{S,R_1,R_2}$) with destination $R_1$. For $P_2$ in the last (i.e., the $(m_{S,R_1,R_2}+1)$-st) sandwich probe, we set its TTL to 255 and destination to $R_2$. Consider FIG. 2 for an illustration, where the sandwich probe (i.e., packets $P_1$, $P_2$, and $P_3$) will be sent four times and TTL values and destinations of P are shown in the table.

We repeat this process for K rounds. In the j-th round, receiver $R_1$ measures the variation $\delta_j(i)$ of the inter-packet interval between the two small packets $P_1$ and $P_3$. Analogously, $\delta'(i)$ of the last probe reflects the transmission and queuing delay of the sub-path up to the branching point (e.g., $I_2$ in FIG. 3.2). Thus, at the end of the K rounds, we have $m_{S,R_1,R_2}+1$ time series:

$$q_j = (\delta_j(1), \ldots, \delta_j(i), \ldots, \delta_j(K)), \quad (10)$$

where $1 \leq j \leq m_{S,R_1,R_2}$, and $$q' = (\delta'(1), \ldots, \delta'(i), \ldots, \delta'(K)). \quad (11)$$

According to Equation (9), the expectation of $\delta_j$ is approximately equal to the summation of $s_2/C_i$ and $\sigma(i)$ along the path S-$R_1$ up to the j-th hop. Then assuming j is the index that minimizes the $|E[\delta_j] - E[\delta']|$, the branching point will be the j-th node from sender S. The pseudo-code of this algorithm, Branching Point Identification (BPI), is given in FIG. 6.

We have presented a branching point identification (BPI) algorithm for the one-sender-two-receiver cases. This scheme can be extended to more generic scenarios where one server is servicing more than 2 end-users. There are many ways to achieve this goal. We now present one such method.

Suppose we have one server S and a set C of N (where $N \geq 3$) clients $\{R_1, R_2, \ldots, R_N\}$. We also maintain two sets D and E, which are initially set to empty. Then, first we randomly pick two clients in C (say, $R_1$ and $R_2$) and apply BPI on routes S-$R_1$ and S-$R_2$ to find their branching point. If these two routes do not share a common path, add both receivers to set D (i.e., D becomes $\{R_1, R_2\}$ now) and remove them from C. Otherwise, add both clients to E and record the corresponding tree $T_1$.

In the next step, we randomly pick one client in C and one with the longest path in E and rerun the above procedure to update C, athcalD, E, and $T_1$. This process loops until C becomes empty, at which time we set C=D, D=E=$\phi$, create a new tree $T_2$, and repeat the above process. This process is repeated until C=E=$\phi$.

Assuming that eventually there are M disjoint trees $T_1$, $T_2$, ..., $T_M$, we merge all the M trees at the root to get the final routing tree. A formal description of this algorithm is given by the pseodocode in FIG. 7.

We next examine the performance of NetScan (i.e., the combination BPI and MT) via ns2 simulations. We still use the single-source topology shown in FIG. 3 and set all routers in the network to be anonymous. Bandwidth, delay, and queue size of links (S-$I_1$, $I_1$-$I_2$, $I_2$-$R_1$, $I_2$-$I_3$, $I_3$-$R_2$) are respectively set to (5, 20, 5, 10, 5) Mb/s, (10, 2, 10, 5, 10) ms, and (100, 500, 100, 200, 100) packets.

In all simulations presented herein, we set packet sizes $s(P_1)=s(P_2)=60$ bytes and $s(P_2)=1500$ bytes, initial inter-packet interval d=100 ms, number of iterations K=50. First, we examine the case where no cross traffic is present. We conduct 5 rounds of simulations, in each of which the branching-point identification algorithm is performed for 500 times.

We use two metrics to evaluate the performance of NetScan. The first is accuracy, which is calculated as the percentage of cases where the branching point is correctly identified. The second metric is anonymous router ratio, which is defined as the ratio between the number of anonymous routers in the induced and actual topologies. Another way to think about the two metrics is that accuracy represents the frequency of errors committed by NetScan, while anonymous router ratio reflects the impact of these errors. As seen from FIG. 8(*a*), the obtained results are 100% accurate under no cross traffic. The anonymous router ratio is plotted in FIG. 8(*b*). As expected, all anonymous routers are resolved and therefore the anonymous router ratio is 1 for all simulations.

Next, we run simulations with cross traffic. To emulate the effect of cross traffic in the network topology shown in FIG. 3, we randomly select 5 pairs of nodes as the source and destination through which cross traffic will traverse. Once the source and destination are chosen, we generate a random number) β of TCP sessions going through this source-destination pair.

Figure 8A:
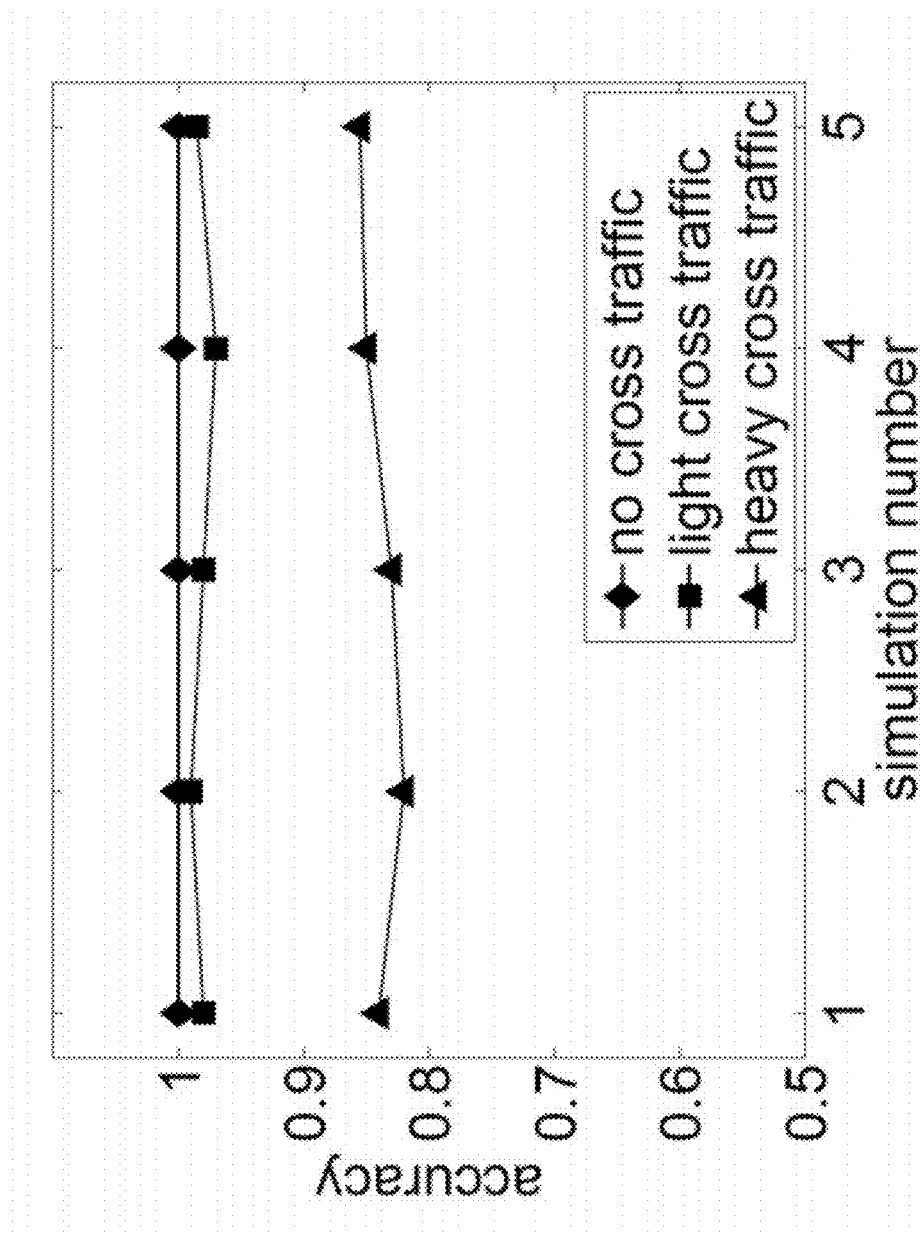
FIGS. 8(a) and 8(b) are graphs showing NetScan with and without accuracy enhancements under different types of cross.
Figure 8B:
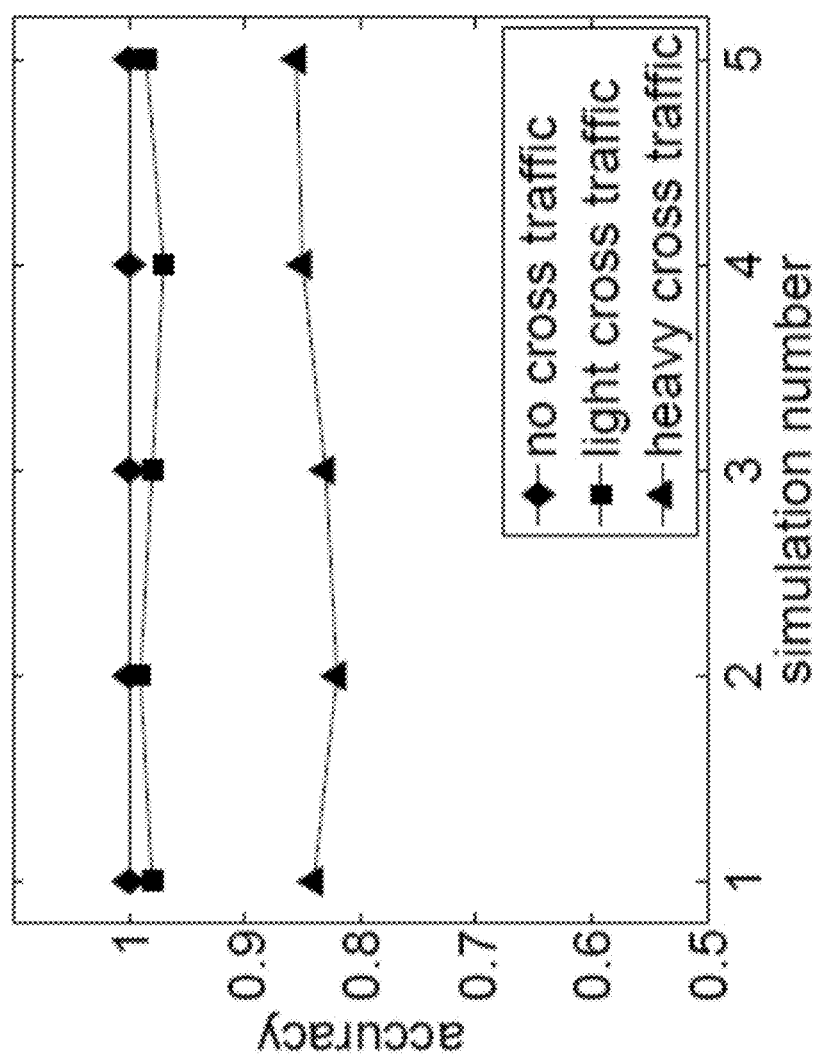

We set the inter-arrival time of TCP sessions to an exponentially distributed random variable with mean λ following a uniform distribution between 0.4 and 0.6, and draw the duration of each flow from a log-normal distribution with mean 0.1 and standard deviation 0.5. We first set β to be in the range between 1 and 5 such that utilization of each link oscillates between 10% and 30%, and run another 500×5 simulations. As shown in FIG. 8(*a*), in the presence of this type (which is referred to as normal in the figure) of cross traffic, the accuracy of our algorithm is around 98%. We next generate heavier cross traffic by changing the upper bound for the number of TCP flows from 5 to 10. We repeat the above simulations and plot the percentage of correct results in FIG. 8(*b*). As shown in the figure, accuracy of our prediction under heavy cross traffic decreases to around 84%. As a consequence, the anonymous router ratio reaches as high as 1.33.

As demonstrated the BPI algorithm exhibits significant accuracy degradation under heavy cross traffic. This is to be expected because as discussed previously—under heavy background traffic—approximation in efeq:E delta generic may become less accurate. Accordingly, we may now explore approaches that may enhance inference accuracy of our algorithm under heavy cross traffic.

One such approach involves setting that the size of packet P should be as large as possible to prevent packet reordering in the presence of cross traffic. Thus, one may be attempted to increase $s(P_2)$ to improve the performance of our algorithm. Since Ethernet limits the size of an MTU to 1500 bytes, sending out IP packets larger than 1500 bytes is equivalent to transmitting multiple back-to-back packets with size equal to 1500 bytes. Motivated by this observation, we next examine whether performance of our algorithm is improved by increasing the number of $P_2$ sent between $P_1$ and $P_3$.

Figure 9A:
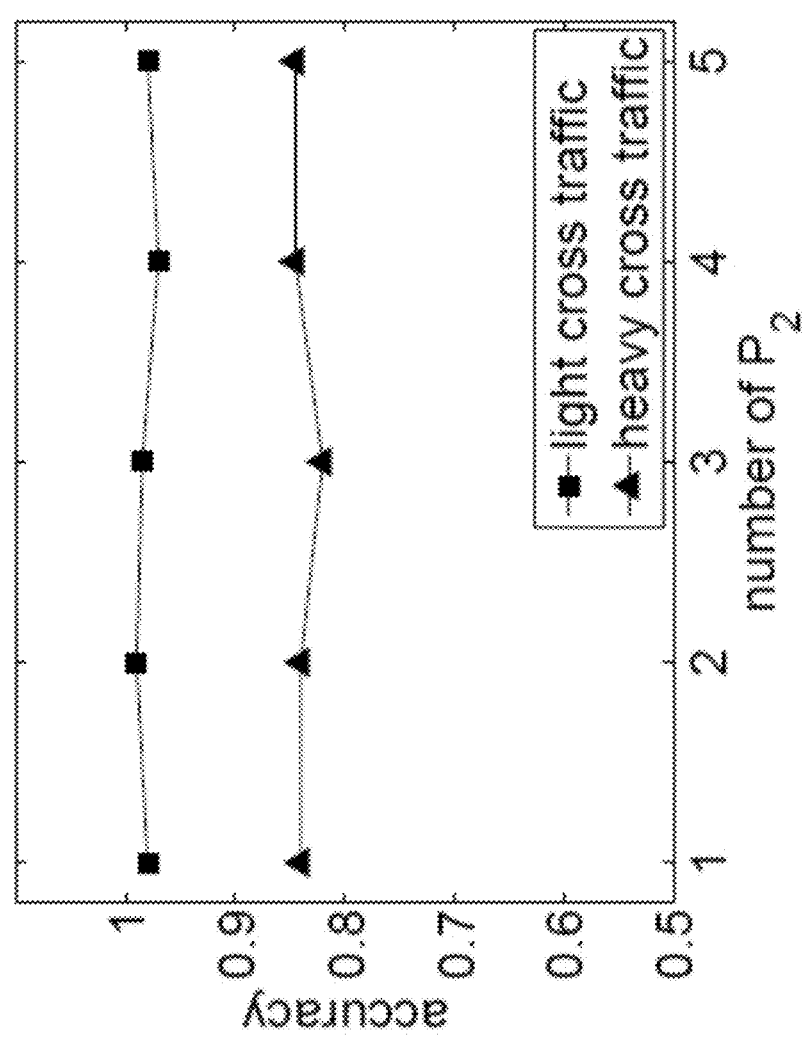
FIG. 9 is a graph showing the effect of the number of nodes.
Figure 9B:
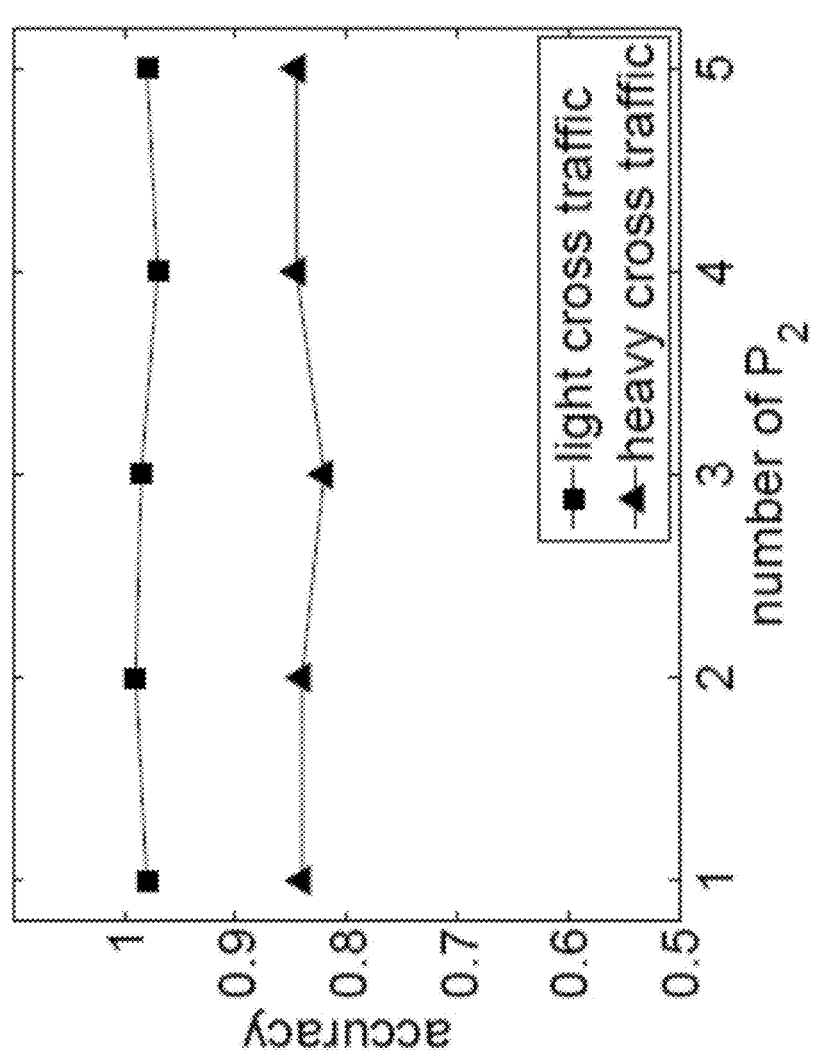

The simulation results are given in FIG. 9, from which we can see that the number of $P_2$ does not have much impact on prediction accuracy of the inference algorithm in either cases. We examined the trace files and found that at intermediate routers these large packets were not queued back to back, but mixed with packets of cross traffic due to statistical multiplexing. Thus, increasing the number of $P_2$ has a similar effect to adding extra cross traffic and therefore will not improve inference accuracy of the underlying algorithm.

We now describe a Complementary Probing (CP) scheme to improve the algorithm's accuracy under heavy cross traffic. The basic idea is to cross-verify the results by swapping the destinations of probing packets. As described by the pseudo-code in FIG. 10, we run one additional round of BPI. In this round, source S sends the first $m_{S,R_1,R_2}$ probes to $R_2$ instead of $R_1$ as in the original BPI and the last one to $R_1$. This way, we can determine a branching point $j^c$ and then compare $j^c$ with $j$ obtained in the previous BPI. If $j^c=j$, then we conclude that node j is the branching point of paths S-$R_1$ and S-$R_2$. Otherwise, we rerun both the original and complementary BPI until we have $j^c=j$ or the number of iterations reaches a constant upper bound $\alpha$, at which point 0 is returned. This indicates that no branching point is found and S-$R_1$ and S-$R_2$ will be two non-overlapping paths in final graph.

This way, we can also determine the branching point and it provides a way to verify the branching point. Now we can use the following scheme to improve the accuracy even in heavier cross traffic scenarios. In one simulation, we first run the enhanced sandwich probing scheme and get the branching point; then run the complementary scheme and get another branching point; if the two are exactly the same, this simulation will terminate and the output will be the agreed branching point; otherwise, we will repeat these two schemes at most another two times depending on if their results are the same or not. If these two results do not agree in all three times, then there is no output.

Figure 11:
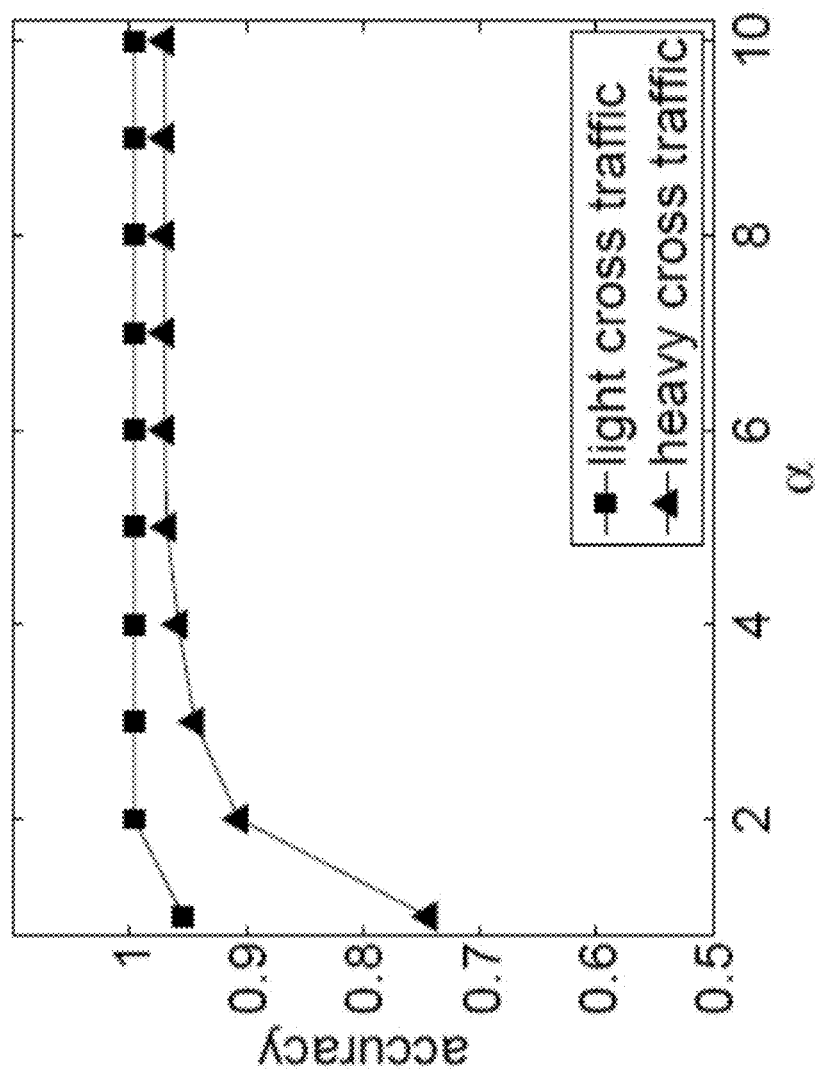
FIG. 11 is a graph showing simulation results of the method with complementary probing according to the present disclosure.

To examine effectiveness of the resulting algorithm, we run 500 ns2 simulations with random generated topology and cross traffic and plot the results under different values of $\alpha$ in FIG. 11. As shown in the figure, the percentage of the correct results reaches as high as 99.6% for normal cross traffic cases and 94.4% for heavier cross traffic cases. In contrast to the results of BPI algorithm without CP, this translates to a 1.6% accuracy improvement for normal traffic and about 10% gain for heavier cross traffic. Moreover, we can also see from FIG. 11 that the accuracy gain becomes negligible when $\alpha$ goes beyond 4. Therefore, we set $\alpha=4$ in practice.

So far, we have described a sequence of steps in NetScan to reconstruct the routing topology tree from one sender to multiple receivers using only end-to-end measurements. Here, we summarize by emphasizing several key properties of NetScan.

First, when calculating $\delta$ in NetScan, only timestamps of the receiver are needed. Therefore, no clock synchronization is required between machines. This makes NetScan a very practical solution for large-scale heterogeneous networks where clock shift is common between hosts.

Second, as demonstrated via ns2 simulations, NetScan has very high inference accuracy (99.6% for normal cross traffic and 94.4% for heavy traffic). We further note that algorithms and simulations presented in this section all assume that none of the intermediate routers in the path responds to traceroute messages. However, in practice there are still a large portion of routers that are not anonymous. Thus, NetScan may be combined with traceroute-based topology inference mechanisms and be applied only to anonymous routers. This way, NetScan will deliver even better performance in real fields.

Finally, topologies inferred by NetScan is the physical layer-3 routing topologies, in which every layer-3 devices that decrement the TTL field in the IP head will present in the resulting graph. This is in sharp contrast to existing methods that are only able to obtain logical topologies.

There are also several limitations of NetScan needing to be considered in practice. First, in contrast to traceroute—which only requires the source to send active probes—NetScan involves participation of both the sender and receivers. Thus, NetScan can only be applied to cases where the operator has access to both the sending and receiving hosts. Fortunately, this is often true in many practical situations. One example is IP service management (e.g., IP-based video conference systems), where stand-alone software or Web-embedded agents are deployed at end-users. In this case, NetScan can be simply implemented as a background service and invoked remotely by the server on demand.

Second, same as all existing topology inference methods, NetScan implicitly assumes static routing during the probing process, while in practice routing path may change over time due to link failures or traffic engineering. However, we believe this is not very serious challenge for NetScan because when resolving anonymous routers and identifying the branching point between two paths, the entire process only involves sending a sequence of back-to-back NetScan probes, which usually finishes within a second. Therefore, most router changes will not affect accuracy of NetScan. In the rare event that a route change does take place during the probing process, NetScan will not be able to identify the anonymous routers. Nonetheless, we believe this is a common issue that cannot be resolved by any existing topology inference methods. One may conduct another round of probing on the same sender and receivers if the previous round fails due to routing changes. This may mitigate the problem, but does not provide a fundamental solution. We leave design of a systematic mechanism to deal with routing changes for future work.

Third, as demonstrated in the previous section, NetScan's is best applicable to networks with normal traffic load (e.g., less than 30% utilization) and exhibits accuracy degradation if the network is heavily utilized. However, we note that the performance degradation is very moderate, i.e., 94.4% under heavy traffic compared to 99.6% under normal traffic. In addition, Internet links are usually lightly utilized, which is especially suitable for application of NetScan. This is further verified in our PlanetLab experiments.

For systems without a central communication hub (such as a large enterprise network with multiple branch offices spanning at different geographical locations), a topology graph that shows connectivity between any pair of endpoints is useful for daily management tasks, such as anomaly diagnosis, event correlation, and impact analysis. We now discuss how NetScan can be generalized to infer the whole connectivity graph.

Here, we assume network being measured enforces symmetric routing (i.e., the route from node i to j is the same as that from j to i), which is a common practice for enterprise networks due to security concerns. We discuss the case of asymmetric routing at the end of the section. s S, $R_1$, and $R_2$, respectively. Then, we first treat S as the sender and $R_1$ and $R_2$ as receivers and reconstruct the corresponding routing tree (i.e., the number of nodes in the route and position of the branching point) using NetScan. Then, treating $R_1$ as the sender and S and $R_2$ as the receivers, we can determine the routing tree from $R_1$ to S and $R_2$. Similarly, we obtain the routing tree with $R_2$ as the root and S and $R_1$ as leaves.

Performance Evaluation

We now evaluate the performance of NetScan using both simulations and experiments. We note that since the topology tree merging algorithm (MT) is deterministic and its effectiveness is purely determined by the accuracy of the branching point identification algorithm (BPI/CP). Therefore, we now only focus on evaluation of BPI/CP.

ns2 Simulations

We start with a simulation study of NetScan using a 600-node transit-stub topology generated by GT-ITM. Capacity and propagation delay of each link are randomly generated within the range [10,100] Mb/s and [5,100] ms, respectively. Buffer size of each ingress link is set to the bandwidth-delay product. Background traffic is generated using the similar process described previously.

NetScan is then tested under different percentages of anonymous routers. For each percentage value, 500 rounds of simulations are conducted. In each round, we randomly choose one node as the sender and seek to infer the routing tree from this node to all the other nodes. To do this, we first construct a partial routing tree using the non-anonymous routers and then apply NetScan only to those anonymous nodes. We calculate inference accuracy and ratio of anonymous routers for each round and take the average over the 500 rounds. The simulation results are illustrated in FIG. 12.

Figure 12:
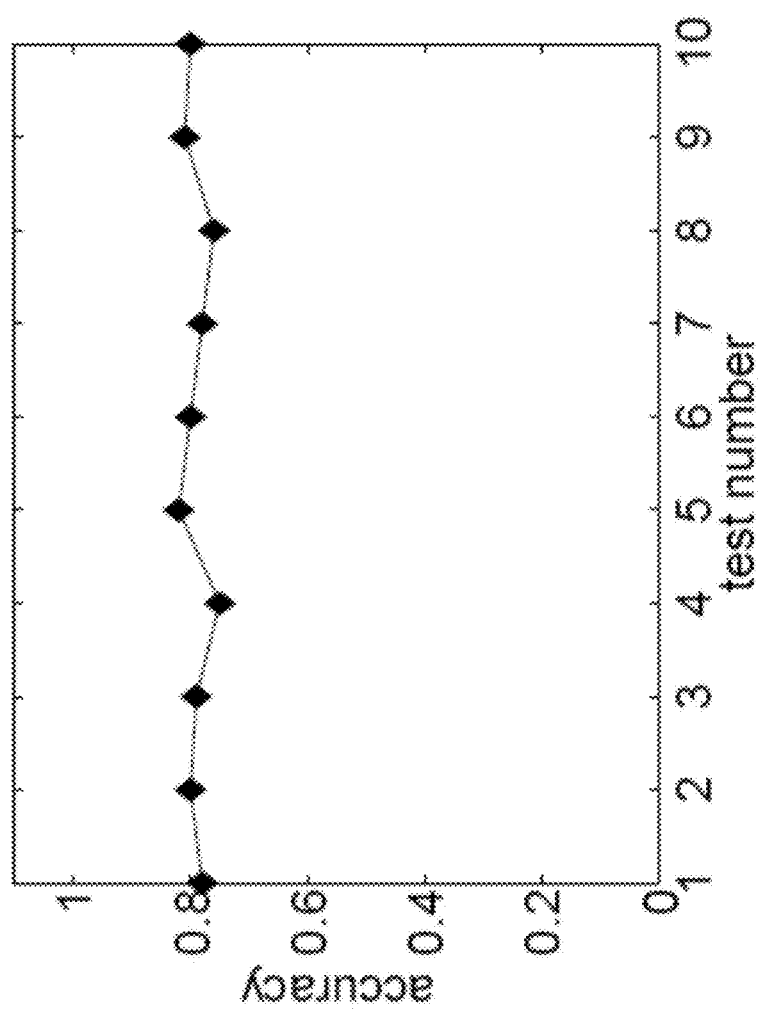
FIG. 12 is a graph showing ns2 simulations of NetScan in a 600-node transit-stub topology according to the present disclosure.

As seen FIG. 12, NetScan is able to achieve high inference accuracy in a large topology and exhibits very good robustness to anonymous routers. Note that if NetScan fails to resolve an anonymous router—which is shared by multiple paths—the unresolved router will be represented by multiple anonymous nodes (one for each sharing path) in the final topology tree. In a transit-stub topology, there exists a node that is shared by many paths. This explains the high anonymous router ratio exhibited in FIG. 12.

Emulab Experiments

We next conducted experiments in Emulab to examine NetScan's performance in a network with no background traffic. We used a simple one-sender-two-receiver topology with respectively 8 and 6 routers in the paths of these two receivers. The branching point is the fourth router.

We conducted 10 separate experiments, each of which is composed of 100 rounds of NetScan probing and branching point identification processes. We then calculated the accuracy as the percentage of correctly inferred cases.

Figure 13:
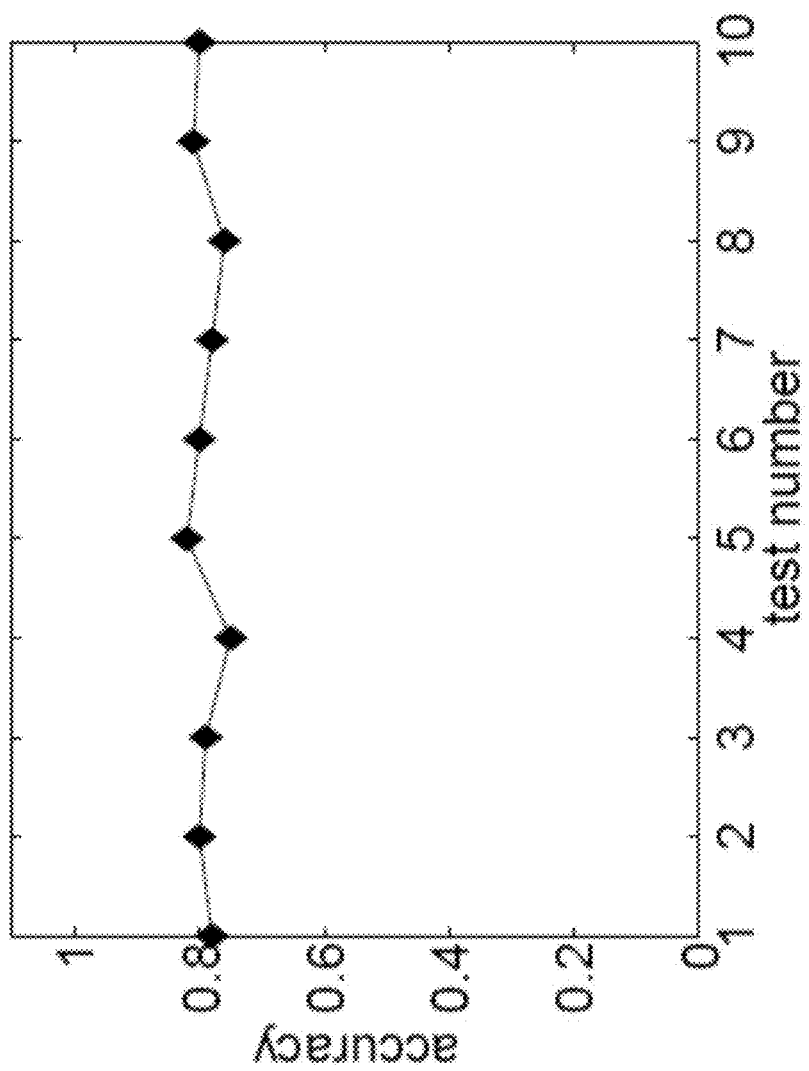
FIG. 13 is a graph showing the performance of NetScan in Emulab with low-bandwidth links according to the present disclosure.

First, we set bandwidth of each link in the magnitude of 10 Mb/s. The experimental results are plotted in FIG. 13. As expected, NetScan performs very well in this scenario and is highly accurate in identifying the branching point. These results align well with ns2 simulations noted previously.

Figure 14A:
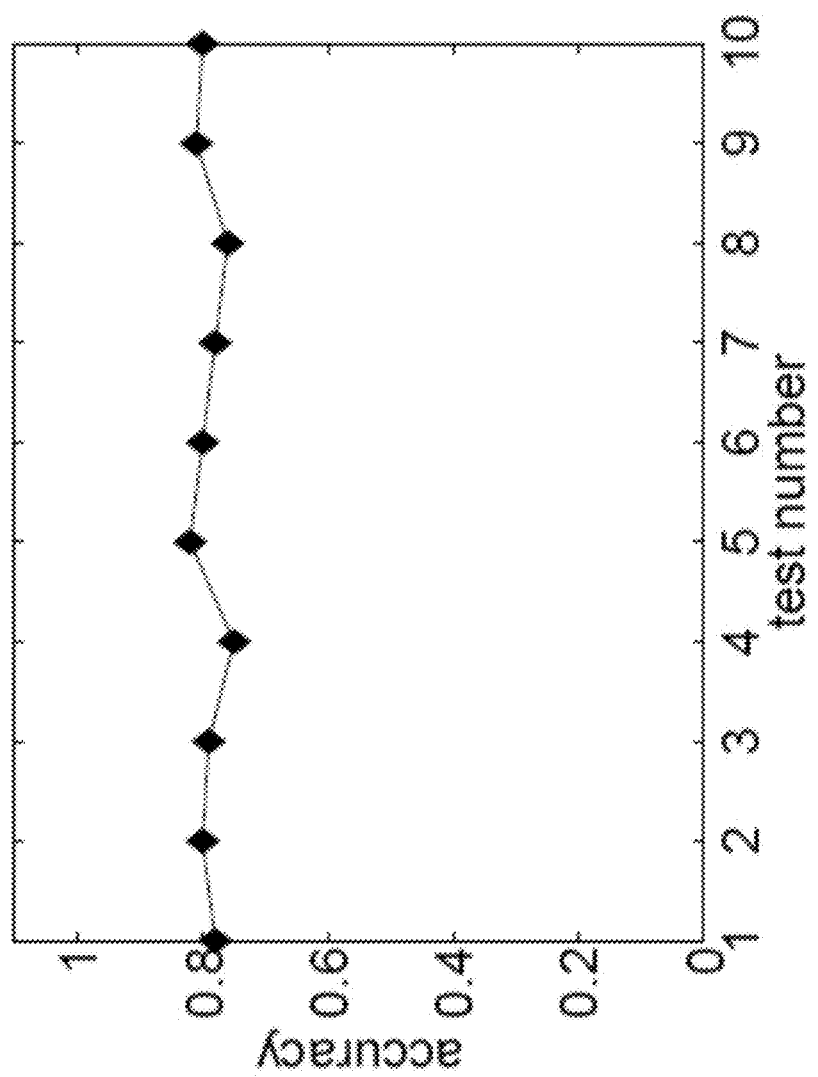
FIG. 14 is a graph showing the performance of NetScan in Emulab with high-bandwidth links according to the present disclosure.
Figure 14B:
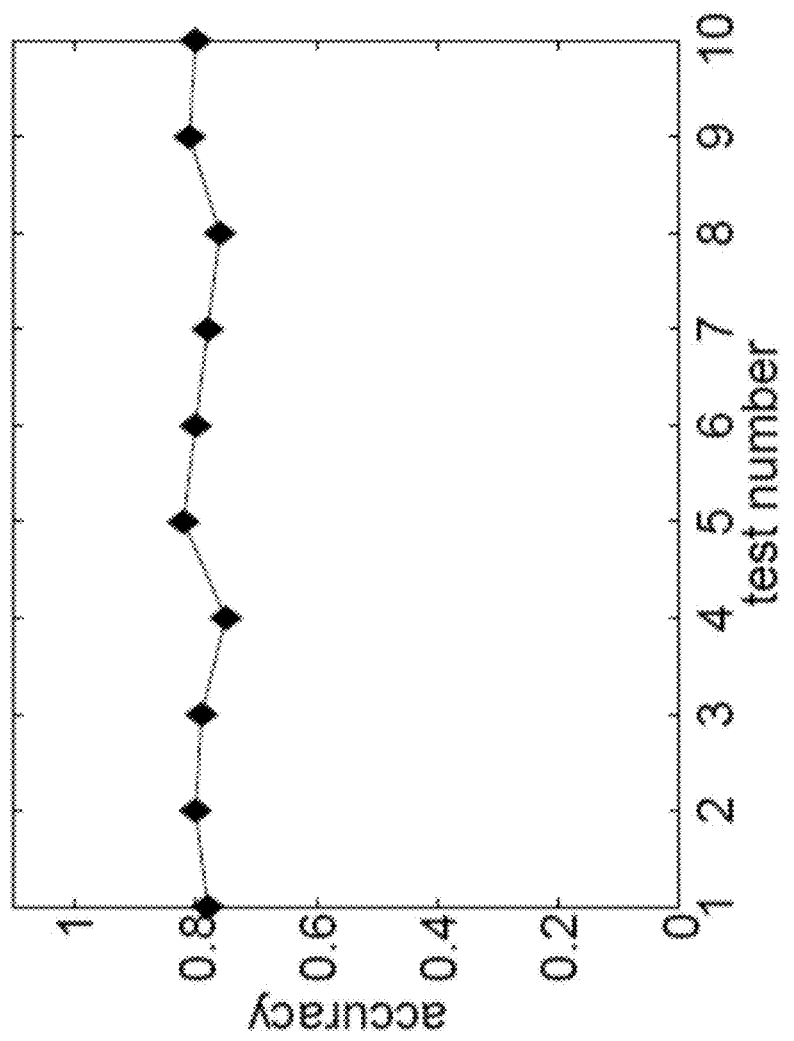

We next increased the link bandwidths to be ten times larger (i.e., in the magnitude of 100 Mb/s) and repeated the above 10 experiments. As illustrated in FIG. 14, NetScan's accuracy is significantly degraded to around 80%. This performance degradation is due to the fact that under no cross traffic, according to (3) 8 equal to the sum of transmission delays $$\sum_{i=1}^{m} \frac{s_2}{C_i},$$

which is the sum of packet $P_2$'s transmission delay inside routers and is very small in high-speed networks. Particularly, in this setting, transmission delay of the large packet $P_2$ is less than 1 ms. As a consequence, NetScan's accuracy is very sensitive to measurement noise and exhibits degraded performance.

From these two sets of experiments, we concluded that in the absence of cross traffic, NetScan performs very well in low-bandwidth networks but not as well in high-bandwidth environments. However, in most practical settings, background cross traffic always exist. In addition, all the above experiments assume all routers are anonymous, which rarely happens in practice. We next tested NetScan in more realistic scenarios where background traffic is present and intermediate routers are partially anonymous.

Planetlab Experiments

We next conducted a set of experiments in Planetlab. We choose 20 Planetlab nodes, 15 of which are US nodes and 5 are overseas. Again, we conducted 100 rounds of NetScan probing and identification processes, in each of which we randomly choose one node as the sender and two nodes as receivers.

Figure 15A:
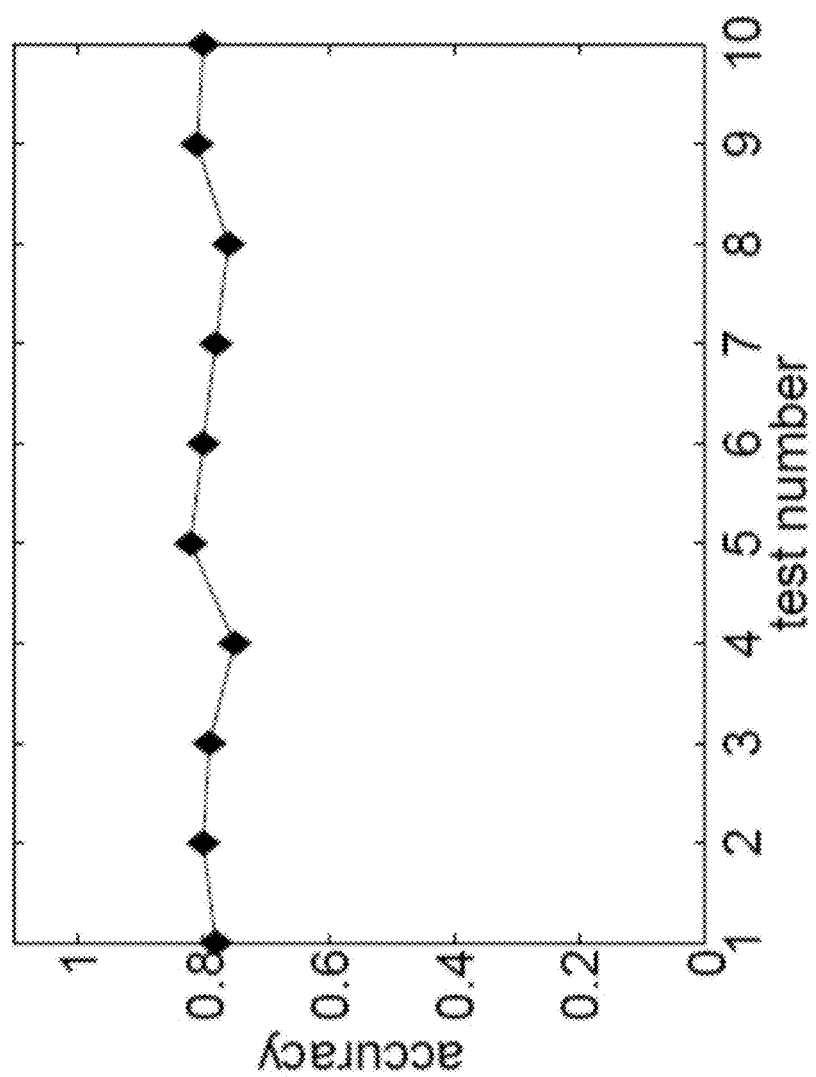
FIG. 15 is a graph showing the performance of NetScan in Planetlab with partial anonymous routers.
Figure 15B:
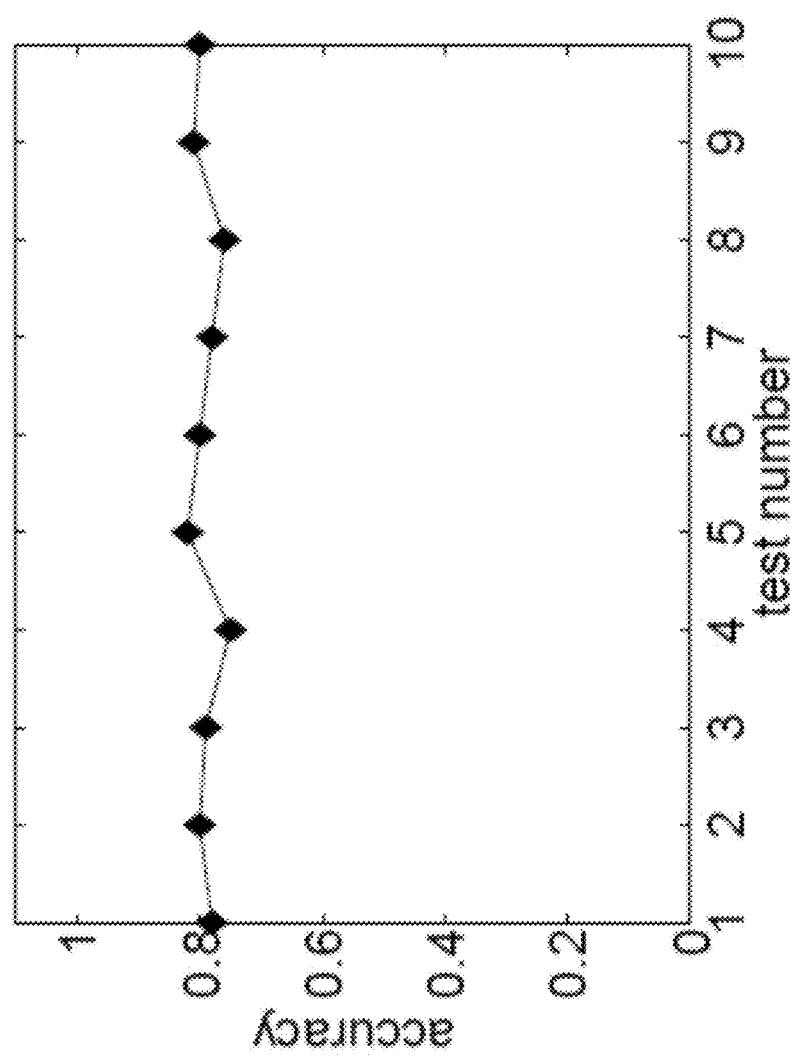
Figure 16:
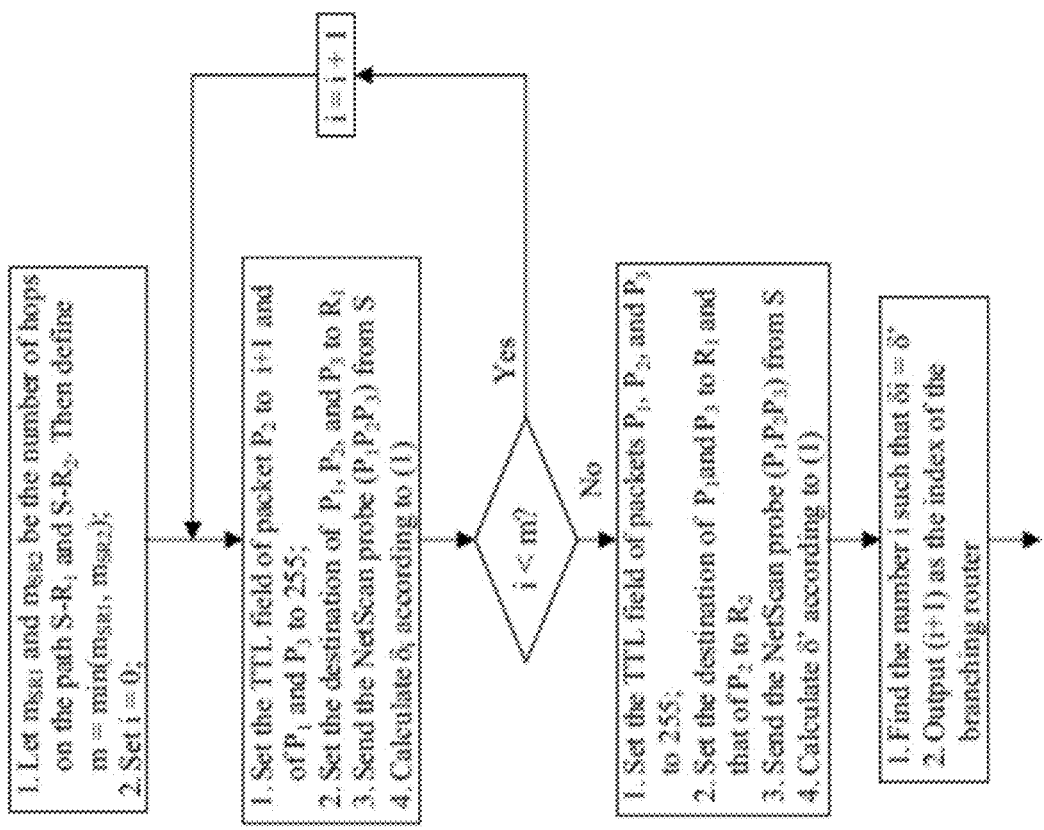
FIG. 16 is a flow chart showing a branching point determination method according to an aspect of the present disclosure.
Figure 17:
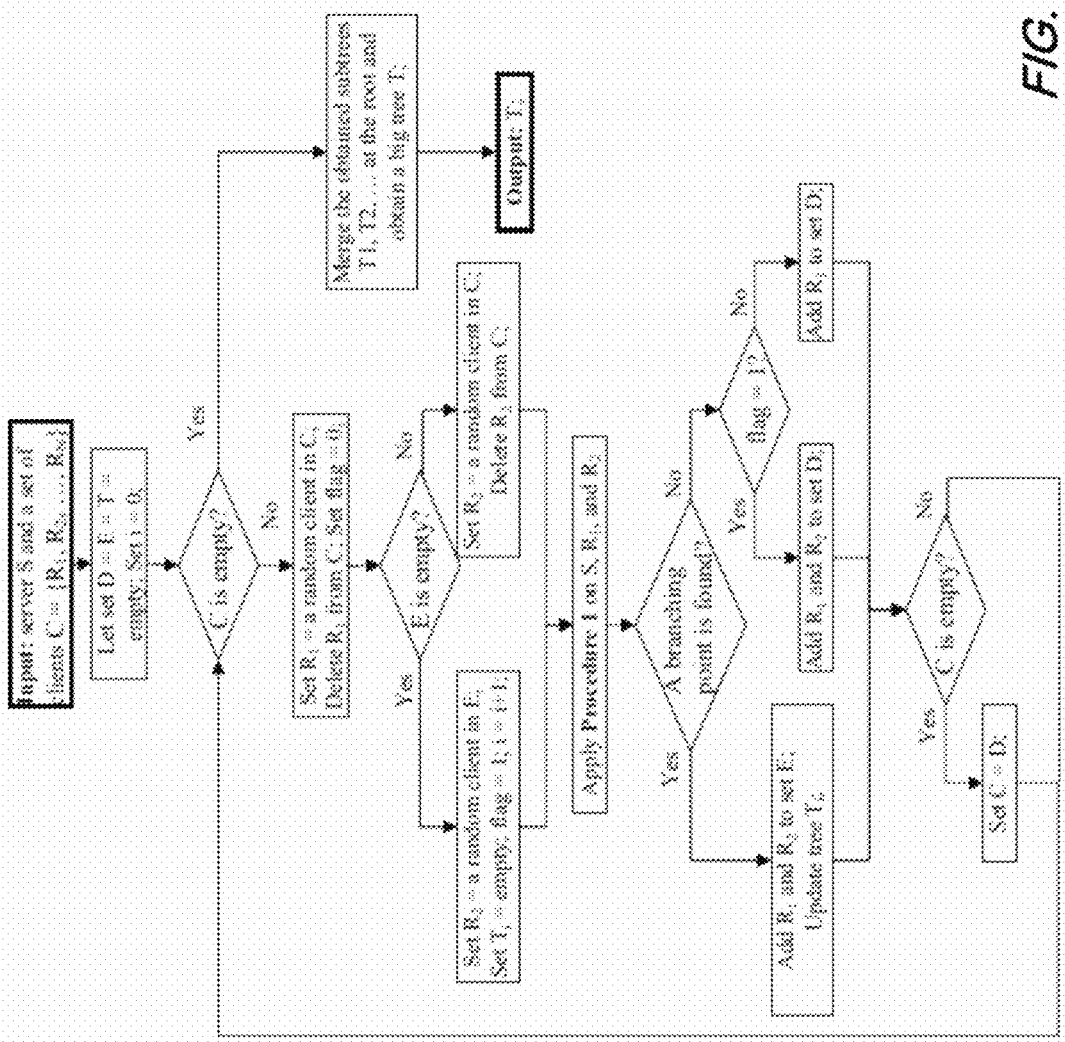
FIG. 17 is a flow chart showing a topology tree reconstruction method according to an aspect of the present disclosure.

In Planetlab, all intermediate routers are responsive to traceroute queries. Thus, we first run traceroute to obtain the ground-truth routing topology. Then, in each round of experiment, we randomly choose different number of nodes to be anonymous by replacing their IP address returned by traceroute queries with "*". This allows us to examine NetScan's performance under different anonymization ratio. The experimental results are illustrated in FIG. 15, from which we can see that NetScan is very robust to anonymous routers. In particular, even with 100% anonymous routers, NetScan still achieves 95% accuracy. All of these properties make NetScan a highly appealing solution for network topology inference for large-scale heterogeneous networks.

At this point, while we have discussed and described the invention using some specific examples, those skilled in the art will recognize that our teachings are not so limited. More particularly, those skilled in the art will readily appreciate that the invention described herein may advantageously be implemented via a variety of digital computers. As known, such digital computers comprise one or more processors, memory and facilities for providing input/output. Accordingly, the invention should be only limited by the scope of the claims attached hereto.

The invention claimed is:

1. A computer implemented method for determining a layer-3 topology of a network comprising the steps of:
    sending from a single source node a sequence of probing packets to two other receiver nodes wherein each node represents a physical layer-3 device;
    determining, based on time-to-live, queuing delay and delay variations between probing packet measurements made at the receiver nodes, two layer-3 routing paths between the source node and the receiver nodes and a node where they diverge;
    repeating the above sending and determining steps after changing source-destination pairs such that a number of layer-3 single source routing sub-trees between a source and a number of destination nodes is determined;
    merging all the sub-trees into a single routing tree; and
    outputting an indication of a network topology which is representative of the network.

* * * * *